US009624998B2

(12) United States Patent
Dhaens

(10) Patent No.: US 9,624,998 B2
(45) Date of Patent: Apr. 18, 2017

(54) ELECTROMAGNETIC FLYWHEEL DAMPER AND METHOD THEREFOR

(71) Applicant: Tenneco Automotive Operating Company Inc., Lake Forest, IL (US)

(72) Inventor: Miguel Dhaens, Lommel (BE)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 0 days.

(21) Appl. No.: 14/799,179

(22) Filed: Jul. 14, 2015

(65) Prior Publication Data

US 2016/0032998 A1    Feb. 4, 2016

Related U.S. Application Data

(60) Provisional application No. 62/030,752, filed on Jul. 30, 2014.

(51) Int. Cl.
F16F 7/10 (2006.01)

(52) U.S. Cl.
CPC .................................. F16F 7/1011 (2013.01)

(58) Field of Classification Search
CPC ....................................................... F16F 7/1011
USPC ........................................ 188/267; 180/65.1
See application file for complete search history.

(56) References Cited

U.S. PATENT DOCUMENTS

| | | | |
|---|---|---|---|
| 3,941,402 A * | 3/1976 | Yankowski | B60G 17/0157 254/1 |
| 5,028,073 A * | 7/1991 | Harms | B60G 13/14 280/43.2 |
| 5,070,284 A * | 12/1991 | Patil | B60G 13/02 188/266.8 |
| 5,307,710 A | 5/1994 | Feldhaus et al. | |
| 5,570,286 A * | 10/1996 | Margolis | B60G 13/14 180/165 |
| 5,664,534 A | 9/1997 | Schmitz | |
| 5,771,756 A | 6/1998 | Mokdad | |
| 5,816,924 A | 10/1998 | Kajitani et al. | |
| 6,450,314 B2 | 9/2002 | Jackel et al. | |
| 7,118,119 B2 * | 10/2006 | Amanuma | B60G 3/20 180/65.51 |
| 7,497,146 B2 | 3/2009 | Clausin | |

(Continued)

FOREIGN PATENT DOCUMENTS

| | | |
|---|---|---|
| JP | 5913136 | 1/1984 |
| JP | 11280824 | 10/1999 |

OTHER PUBLICATIONS

International Search Report and Written Opinion dated Oct. 29, 2015 in corresponding PCT Application No. PCT/US2015/040591 (15 pages).

*Primary Examiner* — Thomas J Williams
*Assistant Examiner* — Mariano Sy
(74) *Attorney, Agent, or Firm* — Harness, Dickey & Pierce, P.L.C.

(57) ABSTRACT

The present disclosure relates to an electromagnetic rotary shock absorber for damping a wheel suspension component associated with a motor vehicle. The electromagnetic rotary shock absorber has a flywheel and at least one damper. The damper has a first element operably associated with the flywheel for driving the flywheel rotationally, and a second element operably associated with the wheel suspension component. The damper operates to dampen relative movement of the wheel suspension component using an inertia of the flywheel.

6 Claims, 4 Drawing Sheets

(56) References Cited

U.S. PATENT DOCUMENTS

| | | | |
|---|---|---|---|
| 7,766,110 B2* | 8/2010 | Suzuki | B60G 3/01 |
| | | | 180/65.31 |
| 8,523,732 B2 | 9/2013 | Le Moal | |
| 9,399,380 B1* | 7/2016 | Fan | B60G 13/14 |
| 2004/0080223 A1* | 4/2004 | Shimizu | B60K 7/0007 |
| | | | 310/75 C |
| 2006/0016629 A1* | 1/2006 | Huard | B60G 11/181 |
| | | | 180/65.1 |
| 2010/0207309 A1* | 8/2010 | Park | B60G 13/14 |
| | | | 267/195 |
| 2011/0278856 A1 | 11/2011 | Jiang et al. | |
| 2012/0161497 A1* | 6/2012 | He | B60K 7/0007 |
| | | | 301/6.5 |
| 2013/0125700 A1 | 5/2013 | Saeki et al. | |
| 2013/0147205 A1 | 6/2013 | Tucker et al. | |
| 2013/0154277 A1 | 6/2013 | Willems | |
| 2014/0083242 A1 | 3/2014 | Oh | |
| 2015/0231942 A1* | 8/2015 | Trangbaek | F16F 15/03 |
| | | | 267/195 |

* cited by examiner

ELECTROMAGNETIC FLYWHEEL DAMPER AND METHOD THEREFOR

CROSS REFERENCE TO RELATED APPLICATIONS

The present disclosure claims priority from U.S. Provisional Patent Application Ser. No. 62/030,752, filed Jul. 30, 2014, the entire contents of which is hereby incorporated by reference into the present disclosure.

FIELD

The present disclosure relates to a rotary damper, and more particularly, to an electromagnetic rotary damper for a vehicular wheel suspension system.

BACKGROUND

This section provides background information related to the present disclosure which is not necessarily prior art.

The wheel suspension system for a vehicle may include an electromagnetic rotary damper which reduces vehicular vibrations generated at the wheel. The electromagnetic rotary damper includes an electric motor having a rotor and a stator, which are connected to a vehicle body. Such dampers are also used as an energy harvester for generating energy from the movement of the wheel suspension system. The electromagnetic rotary damper should be capable of handling low and high frequency disturbances experienced by the wheel suspension system.

SUMMARY

In one aspect the present disclosure relates to an electromagnetic rotary shock absorber for damping a wheel suspension component associated with a motor vehicle. The electromagnetic rotary shock absorber comprises a flywheel and at least one damper. The damper has a first element operably associated with the flywheel for driving the flywheel rotationally, and a second element operably associated with the wheel suspension component. The damper operates to dampen relative movement of the wheel suspension component using an inertia of the flywheel.

In another aspect the present disclosure relates to an electromagnetic rotary shock absorber for damping a wheel suspension component associated with a motor vehicle. The electromagnetic rotary shock absorber comprises a flywheel, a damper and an electronic controller. The damper is operatively disposed between the flywheel and the wheel suspension component and operates to dampen relative movement of the wheel suspension component using an inertia of the flywheel. An electronic controller is used for controlling the damper.

In still another aspect the present disclosure relates to a method for damping a wheel suspension component associated with a motor vehicle. The method comprises providing a damper in the form of an electric motor having a rotor and a stator. The method further involves operatively coupling a flywheel to the rotor to enable the flywheel to be driven rotationally by the rotor. The method also involves operatively coupling the stator to the wheel suspension component, and using a mass of the rotating flywheel to dampen movement of the wheel suspension component.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
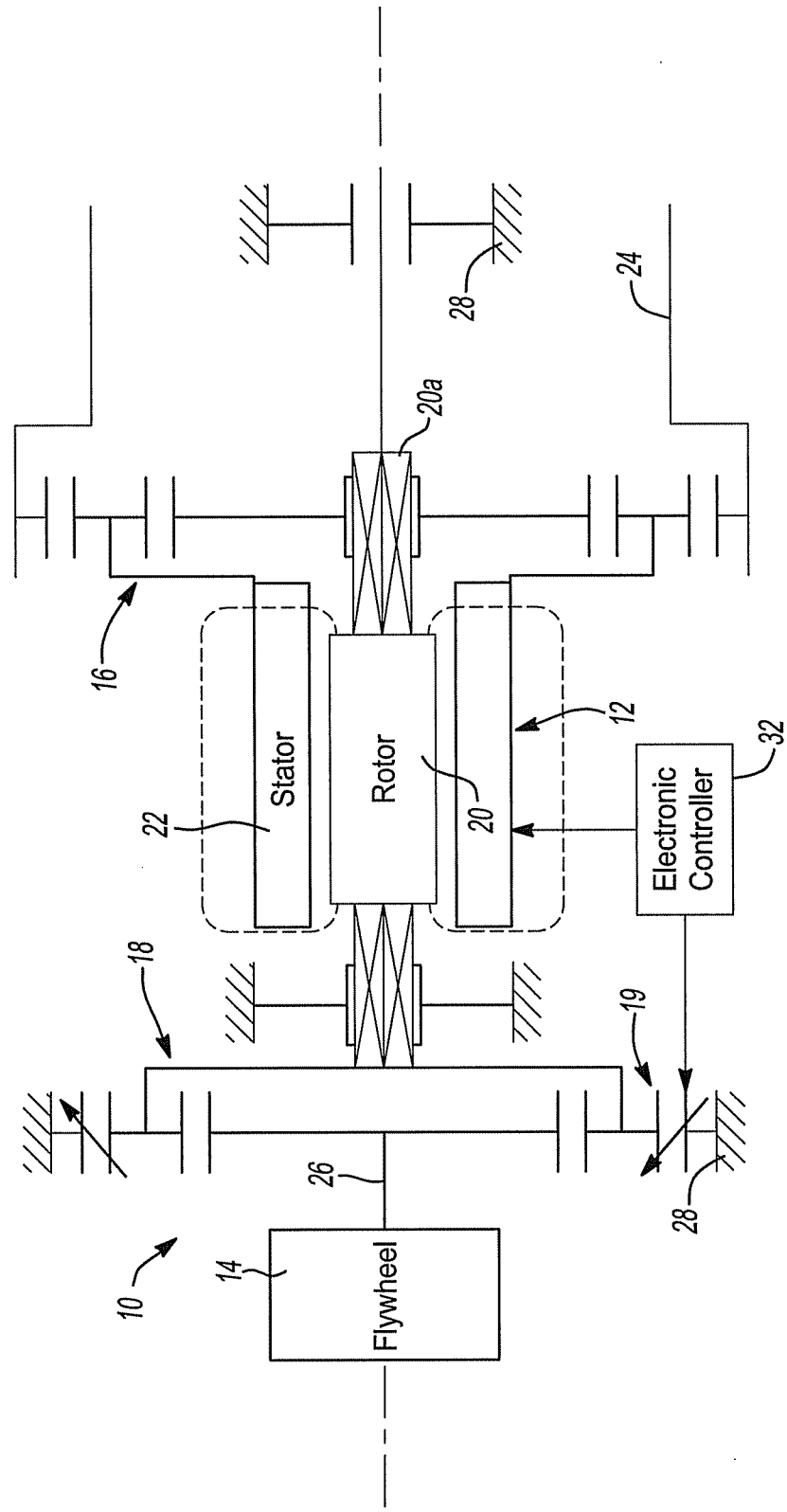
FIG. 1 is a schematic view of an electromagnetic rotary flywheel damper (EF damper) for a vehicle suspension system.

The present disclosure will now be described more fully with reference to the accompanying drawings. The following description is merely exemplary in nature and is not intended to limit the present disclosure, application or uses. FIG. 1 illustrates an electromagnetic rotary flywheel damper 10 (hereinafter "EF damper 10") for a suspension system of a vehicle. The vehicle may be any type of vehicle such as, without limitation, an automobile, van, light truck, truck or SUV.

The EF damper 10 includes an electric motor 12, a flywheel 14, first and second gearboxes 16 and 18, and a clutch 19. The gearboxes 16 and 18 may be any kind of speed multiplier (e.g., harmonic drives). The electric motor 12 includes a rotor 20 and a stator 22. The stator 22 is connected to a suspension link 24 of the vehicle via the first gearbox 16. The rotor 20 is connected to the flywheel 14 via the second gearbox 18. The rotor 20 and the flywheel 14 are connected such that the rotor and the flywheel spin freely around one axis 26 independent of the vehicle body. The rotor 20 turns at a speed for maximum electromagnetic coupling. The flywheel 14 may be made of steel or any other suitable material.

A bearing 20a of the rotor 20 is connected to, or otherwise partially supported from, a chassis 28 of the vehicle to carry the force of the suspension system. The clutch 19 may be used to couple the flywheel 14 to the chassis 28 via the second gearbox 18. The gearboxes 16 and 18 are reduction gears such as planetary gears. The first gearbox 16 amplifies the relative movement of the suspension system to improve the resolution of the movement of the rotor 20 relative to the stator 22.

Figure 2A:
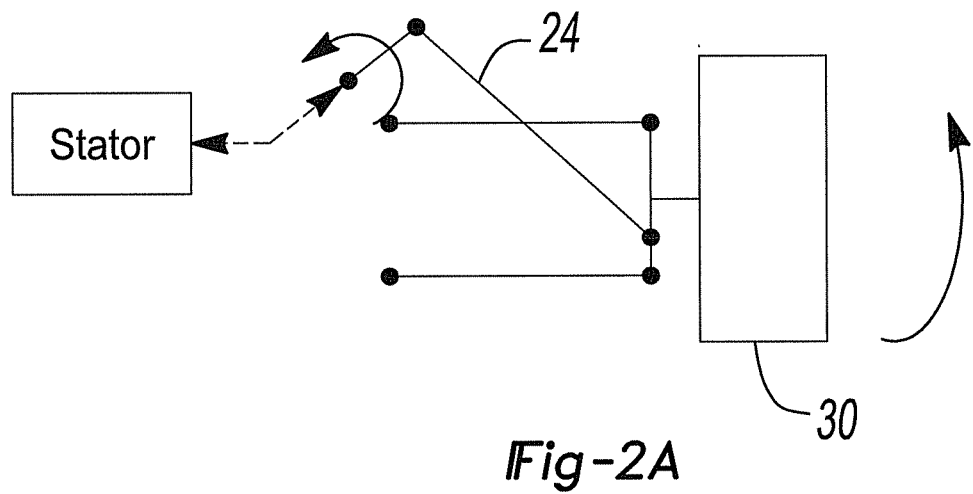
FIG. 2A illustrates a connection of a wheel of the vehicle and a suspension link which is coupled to a stator of the EF damper.
Figure 2B:
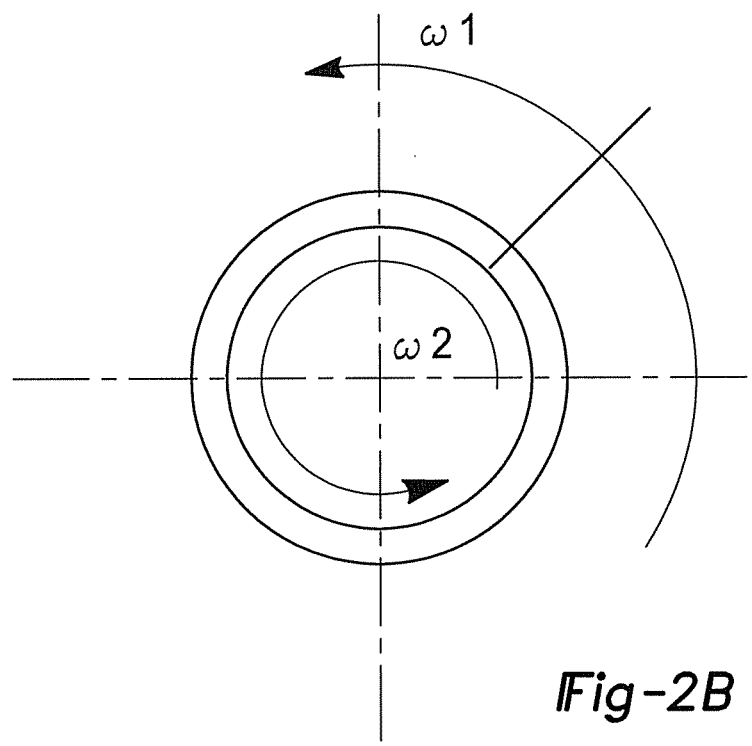
FIG. 2B depicts an angular speed of the suspension link ($\omega 1$) and a nominal angular speed of the rotor ($\omega 2$)
Figure 3:
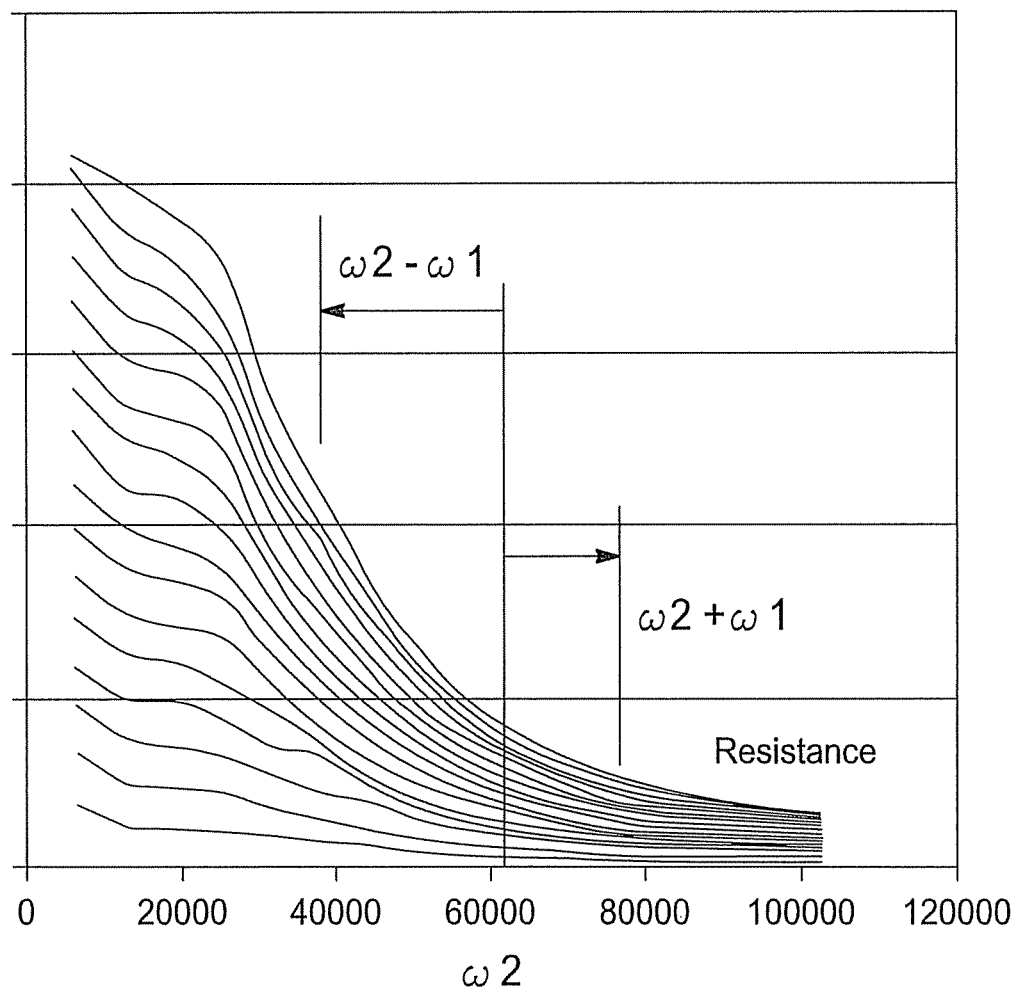
FIG. 3 illustrates characteristics of a semi-active system having the EF damper without a clutch.

FIG. 2A illustrates a connection of a wheel 30 and the suspension link 24, and where the suspension link is coupled to the stator 22 (shown in diagrammatic form). Movement of the wheel 30 is transferred to the suspension link 24 as an angular speed $\omega 1$. FIG. 2B depicts the angular speed of the suspension link 24 ($\omega 1$) and the nominal angular speed of the rotor 20 ($\omega 2$). FIG. 3 illustrates a chart of various loads placed on the EF damper 10 plotted as current or torque vs. angular speed.

At static operation, the flywheel 14 is controlled to spin at a set speed by a controller of the electric motor 12. The set speed of the flywheel 14 is seen by the stator 22 as a nominal angular speed $\omega 2$ (i.e., the nominal angular speed of the rotor 20). Motion of the suspension system is transferred to the stator 22 creating a relative rotation of the stator (i.e., a wheel event). More particularly, the relative movement of the suspension system is seen by the stator 22 as a relative variation in speed by the rotor 20. Depending on a plurality of factors that include the strength of the magnetic coupling between the stator 22 and rotor 20, the rotating speed of the flywheel 14, and the impact energy of the suspension movement, the force of the relative movement is either accelerating the flywheel 14 or acting as a force against the rotor and/or flywheel (FIG. 3) to slightly and momentarily attenuate the angular speed of the flywheel 14. This is in effect the damping force.

For a semi-active system, the EF damper 10 dissipates energy. For an active system, the EF damper 10 can create an active vertical force to the vehicle body for a certain time. As part of an active system, the EF damper 10 includes a clutch to vary the rotating resistance of the flywheel 14. More particularly, in an active mode, a controller (or inverter) 32 (FIG. 1) associated with the electric motor 12 may regulate the speed of the flywheel 14 to the preselected speed. Higher forces can be generated by the electric motor 12 by varying the load line or resistance. Specifically, the load is varied by engaging the clutch 19 between the flywheel 14 and the chassis 28 of the vehicle. The controller 32 is controlling the torque demands of the electric motor 12 and speed regulation of the flywheel 14. The clutch is controllable by an electrical signal either from the controller 32 or from a different controller.

Figure 4:
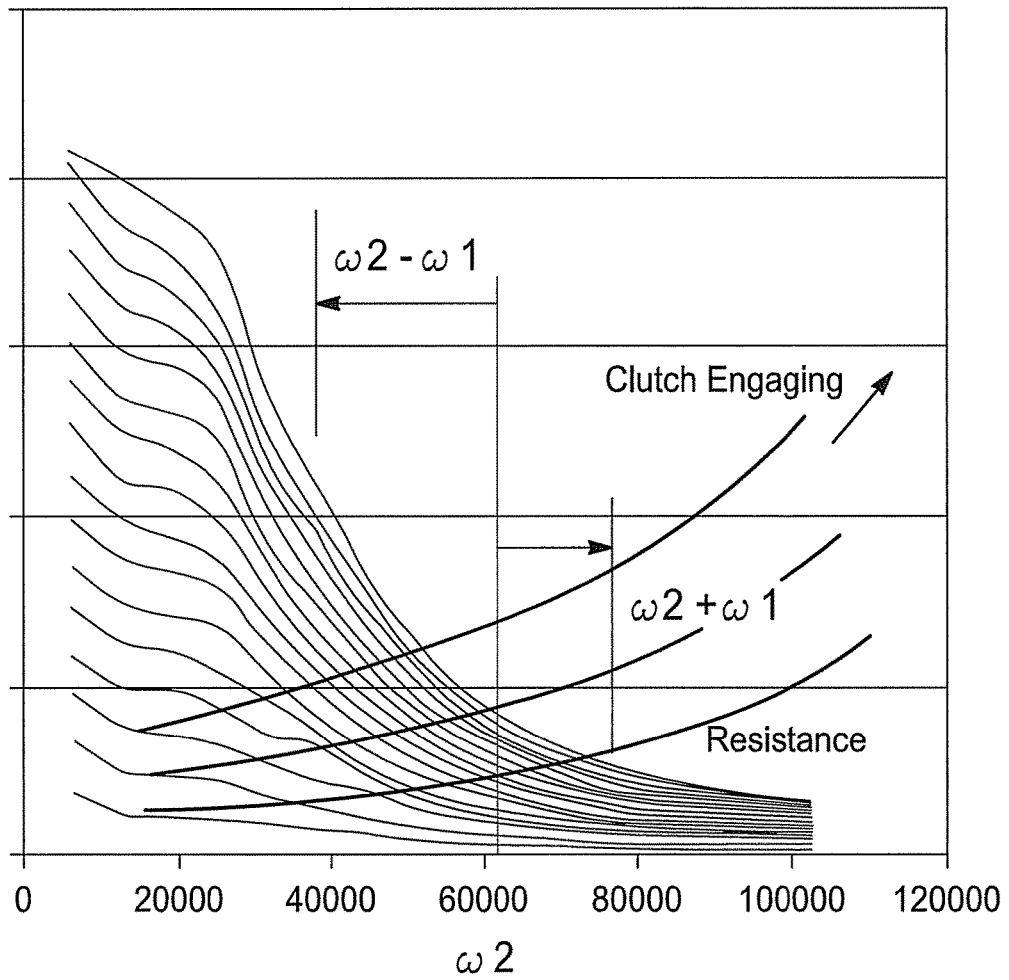
FIG. 4 illustrates characteristics of an active system having the EF damper with the clutch.

FIG. 4 illustrates the properties of the EF damper 10 when it is implemented as an active system. As an active system, the resistance level as seen by the rotor 20, relative to the stator 22, is moved (varied) by engaging the clutch 19. Thus, a certain (controlled) amount of force can be created which acts on the suspension link 24.

At high frequencies, the rotor 20 and flywheel 14 absorb the energy by rotating freely without being controlled by the controller 32. The controller 32 actively controls the rotor 20, and thus the angular speed of the flywheel 14, at low frequency bands, which is manageable by the controller. The disturbance experienced by the EF damper 10 at high frequencies is absorbed by the inertia of the rotor 20.

The EF damper 10 comprises at least one damper element for damping the relative movement of a first mass located at the wheel suspension side against the inertia of a fast spinning flywheel connected to supported from the vehicle body. The electric motor 12 of the EF damper 10 produces an electromagnetic resistance force that opposes the relative rotational movement of the flywheel. Due to the inertia of the flywheel 14, harsh movements of the suspension system do not translate into high peak currents. In summary, the EF damper 10 of the present disclosure is a suspension rotary damper, comprising an electromagnetic motor combined with a flywheel system for harshness compliance. The EF damper 10 dampens the peak currents during the operation of an electromagnetic damper system by use of the flywheel.

The foregoing description of the various embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An electromagnetic rotary shock absorber for damping a wheel suspension component associated with a motor vehicle, the electromagnetic rotary shock absorber comprising:
   a flywheel; and
   at least one damper including an electric motor having a rotor operably associated with the flywheel via a first gearbox for driving the flywheel rotationally, and a stator operably associated with the wheel suspension component via a second gearbox, the damper operating to dampen relative movement of the wheel suspension component using an inertia of the flywheel.

2. The electromagnetic rotary shock absorber of claim 1, wherein the flywheel is operatively coupled to the first gearbox via a clutch.

3. The electromagnetic rotary shock absorber of claim 1, wherein the wheel suspension component comprises a suspension link of the vehicle.

4. The electromagnetic rotary shock absorber of claim 1, further comprising an electronic controller for controlling the damper.

5. A method for damping a wheel suspension component associated with a motor vehicle, the method comprising:
   providing a damper in the form of an electric motor having a rotor and a stator;
   operatively coupling a flywheel to the rotor to enable the flywheel to be driven rotationally by the rotor;
   operatively coupling the stator to the wheel suspension component;
   using a mass of the rotating flywheel to dampen movement of the wheel suspension component;
   using a first gearbox to operatively couple the rotor to the flywheel; and
   using a second gearbox to operatively couple the stator to the wheel suspension component.

6. The method of claim 5, further comprising:
   using an electronic controller to control operation of the electric motor, and thus a rotational speed of the flywheel.

* * * * *